United States Patent [19]

Iwata et al.

[11] 4,131,351
[45] Dec. 26, 1978

[54] BATTERY CHECKER FOR A CAMERA WITH A FLASH LIGHT UNIT

[75] Inventors: Hiroshi Iwata; Tetsuo Yamaoka, both of Osaka,, Japan

[73] Assignee: West Electric Co., Ltd., Osaka, Japan

[21] Appl. No.: 769,215

[22] Filed: Feb. 16, 1977

[30] Foreign Application Priority Data

Feb. 20, 1976 [JP] Japan .................................. 51/18138
Jul. 19, 1976 [JP] Japan .................................. 51/86457

[51] Int. Cl.² ...................... G03B 15/05; G03B 7/00; H01H 9/00
[52] U.S. Cl. ................. 354/60 F; 354/60 L; 354/127; 200/308
[58] Field of Search ............ 354/53, 60 R, 60 L, 354/127, 128, 289, 60 F; 200/308, 310, 312

[56] References Cited

U.S. PATENT DOCUMENTS

| | | |
|---|---|---|
| 3,643,100 | 2/1972 | Engelsmann et al. ........... 354/128 X |
| 3,661,062 | 5/1972 | Wisst .................................. 354/60 L |
| 3,812,504 | 5/1974 | Wagensonner et al. ........... 354/60 L |

*Primary Examiner*—L. T. Hix
*Assistant Examiner*—William B. Perkey
*Attorney, Agent, or Firm*—Stevens, Davis, Miller & Mosher

[57] ABSTRACT

In a camera of the type including an electronic flash light unit with a relatively large-capacity capacitor and an electronic shutter which are supplied with power from a common power source battery, the power source battery is checked to determine whether it is in good condition for service. When the battery is electrically connected to the flash light unit, the operation of the battery checker to detect the voltage across the battery, is prevented by either a mechanical switch or a slide cover that covers the indication of the battery checker.

7 Claims, 5 Drawing Figures

BATTERY CHECKER FOR A CAMERA WITH A FLASH LIGHT UNIT

The present invention relates to battery checkers of the type designed to indicate that the power source battery has not been used up to the limit of its service life, and more particularly the invention relates to such battery checker designed for use with a camera in which power is supplied from a common power source battery to an electronic flash light unit of a type having an electronic flash discharge tube through which the stored energy of a main discharge capacitor is discharged to cause the discharge tube to produce a flash, and an electronic shutter capable of automatically controlling the exposure time in accordance with the brightness of light on an object to be photographed.

With the cameras of the type having the electronic flash light unit and the electronic shutter, generally a power source battery which is small in size and capacity is employed for operating the electronic shutter and a power source battery of a larger capacity than the battery for the electronic shutter is employed for operating the electronic flash light unit since it must repeatedly charge the large-capacity main discharge capacitor many times. Thus, if a battery checker is provided for each of the power source batteries, there will be no possibility of the battery checkers operating erroneously.

With the cameras of the type wherein both the electronic shutter and the electronic flash light unit are energized by the common power source battery, if the remaining service life of the common power source battery is checked by a single battery checker, it is necessary to provide two different preset voltages for the battery checker and moreover the detection of the preset voltage must be effected separately for each of the electronic shutter and the electronic flash light unit thus requiring a rather cumbersome operation.

Also, the known electronic flash light units conventionally include a DC-DC converter circuit for increasing the voltage of the power source battery since the flash light units require high voltage. Since a considerably large current flows in the DC-DC converter circuit during the charging period of the large-capacity capacitor in the flash light unit, with the power source battery connected to the flash light unit the voltage developed across the power source battery is lower than the battery voltage obtained when the flash light unit is not connected to the power source battery. As a result, when the remaining service life of the power source battery is checked only in relation to the electronic shutter of the camera in which the electronic shutter and the electronic flash light unit are energized by the common power source battery, particularly if the check is made while the power source battery is being connected to the flash light unit charging the large-capacity capacitor, there is the possibility of the battery checker giving an erroneous indication that the power source battery has been used up to the limit of its service life despite of the fact that the power source battery is still serviceable for supplying the power to the electronic shutter.

Therefore, it is an object of the present invention to overcome the foregoing deficiencies. In accordance with the present invention there is thus provided an improved battery checker for a camera of the type incorporating an electronic shutter and an electronic flash light unit, and the battery checker includes means for detecting and indicating the remaining service life of the power source battery.

The above and other objects, features and advantages of this invention will be apparent from the following detailed description taken in conjunction with the accompanying drawings, in which.

Figure 1:
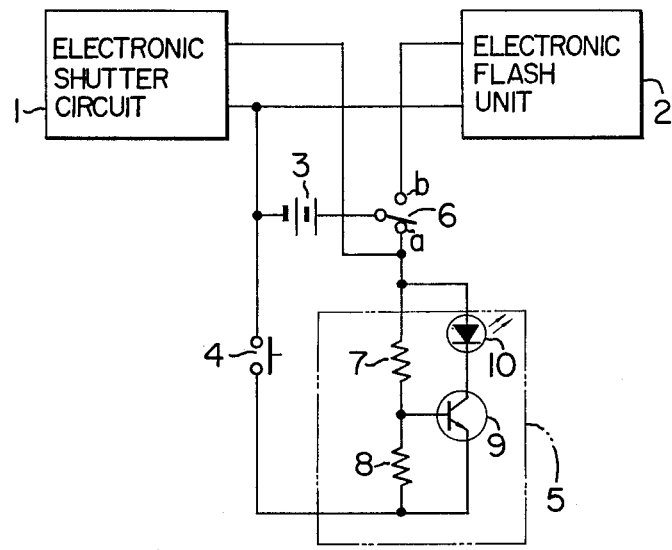
FIG. 1 is a circuit diagram for an embodiment of a battery checker according to the invention.
Figure 4:
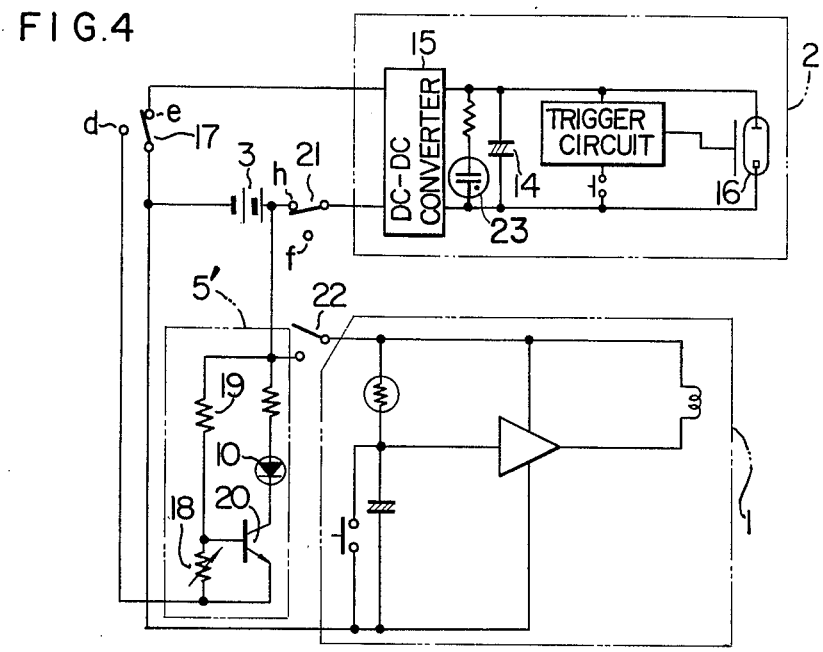
FIG. 4 is a circuit diagram for still another embodiment of the battery checker according to the invention.

Referring now to FIG. 1, numeral 1 designates an electronic shutter circuit of a photographic camera and numeral 2 designates an electronic flash light unit (both of these elements are of the known type as shown by their exemplary circuits shown in FIG. 4). Numeral 3 designates a power source battery, 4 a switch operable when detecting the remaining service life of the power source battery 3, 5 a circuit for detecting and indicating the voltage across the power source battery 3, 6 a selector switch.

Before taking any photographs, the photographer must first detect the battery voltage to see whether the terminal voltage of the power source battery 3 is higher than the minimum operating voltage of the electronic shutter circuit 1, and generally in response to the operation of a switch operatively associated with the release button of the camera or the operation of a switch by the depression of a pushbutton mounted on a portion of the camera body the switch 4 is closed thus bringing the battery voltage detector and indicator circuit 5 into operation.

More specifically, when the switch 4 is closed in the operating mode of the electronic shutter circuit 1 when the selector switch 6 designed to connect the power source to the electronic flash light unit 2 or the electronic shutter circuit 1 has been actuated to its a position, the battery 3 is connected to the battery voltage detector and indicator circuit 5 and the battery voltage divided by resistors 7 and 8 is applied to the base of a transistor 9.

Assuming now that $E_1$ represents the minimum working voltage of the power source voltage 3 and the preselected resistance values of the resistors 7 and 8 are such that the terminal voltage of the resistor 8 derived by dividing the voltage of the power source battery 3 through the resistors 7 and 8 exceeds the base potential of the transistor 9 at the minimum working voltage $E_1$, the transistor 9 is turned on so that an indicator element 10, e.g., light emitting diode connected to the collector of the transistor 9 is turned on thus giving an indication that the power source battery 3 is in condition for service.

On the other hand, when the selector switch 6 is actuated to its b position, the power source battery 3 is connected to the electronic flash light unit 2 so that even if the battery voltage detection switch 4 is closed, the power source battery 3 is not connected to the battery voltage detector and indicator circuit 5 and the detection of the voltage across the power source battery 3 is inhibited thereby preventing the occurrence of any erroneous operation.

Figure 2:
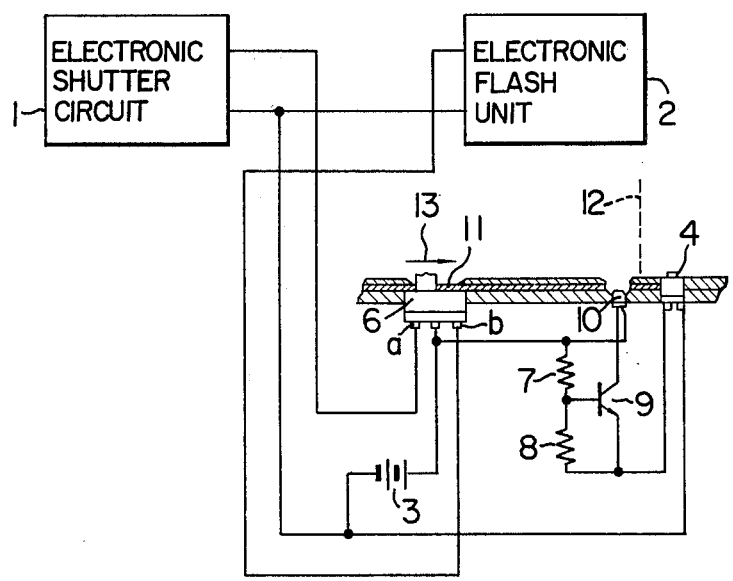
FIG. 2 is a partially schematic circuit diagram for another embodiment of the battery checker according to the invention.

FIG. 2 shows a second embodiment of the invention, in which a slide member 11 is operatively associated with the selector switch 6 so as to mechanically cover the light emitting indicator element 10 of the battery voltage detector and indicator circuit 5 and thereby inhibit external observation thereof. The Figure shows the conditions in which the selector switch 6 has been actuated to the a position thereby permitting the external observation of the light emitting indicator element 10.

On the contrary, when the selector switch 6 is actuated to the b position so as to bring the electronic flash light unit 2 into operation, the slide member 11 is moved in the direction of an arrow 13 up to the position shown by a dotted line 12, thus inhibiting the external observation of the light emitting indicator element 10 and hence the detection and indication of the voltage across the power source battery 3 during the time that the flash light unit 2 is in operation.

Figure 3:
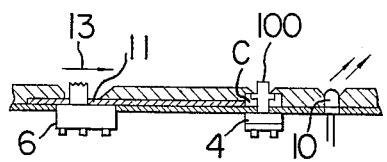
FIG. 3 is a partial sectional view of still another embodiment of the battery checker according to the invention.

FIG. 3 shows a third embodiment of the invention, in which the switch 4 comprises a mechanical pushbutton switch and the slide member 11 is movable into a slot C of an operating member 100 of the switch 4 so as to prevent the depression thereof.

It will thus be seen from the description of the embodiments shown in FIGS. 1 to 3 that the preset value of the minimum working voltage of the power source battery is selected equal to the minimum operating voltage of the electronic shutter and the operation of the battery voltage detector and indicator circuit is electrically or mechanically inhibited when the power source battery is supplying the power to the flash light unit, thus permitting detection and indication of the remaining service life of the power source battery without erroneous operation.

FIG. 4 shows still another embodiment of the invention which is so designed that the remaining service life of the power source battery can be detected without any possibility of erroneous operation even if the power source battery is connected to the electronic flash light unit.

Figure 5:
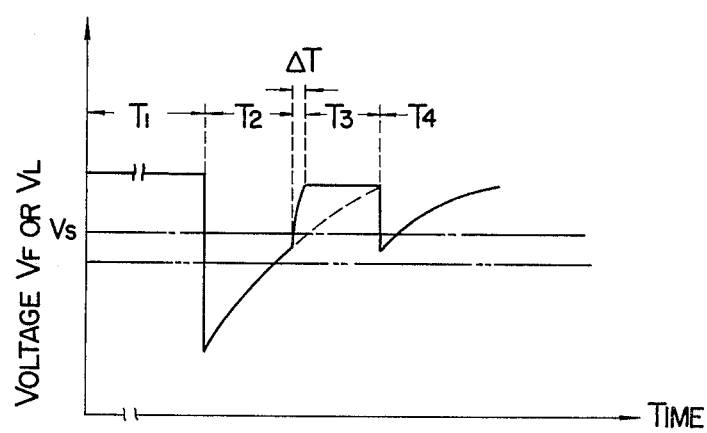
FIG. 5 is a graph showing the variations in the voltage across the power source battery used in the embodiment of FIG. 4.

In the Figure, a switch 17 for detecting the voltage of the power source battery 3 is provided in the energizing circuit for energizing, from the power source battery 3, the electronic shutter circuit 1 for electrically controlling the exposure interval and the electronic flash light unit 2 comprising a DC-DC converter circuit 15, a main capacitor 14, a flash discharge tube 16, etc. The switch 17 may for example be an automatic reset pushbutton switch which is so designed that the switch is normally placed at its e position and it is actuated to its d position when the pushbutton is depressed. FIG. 5 shows the variations in the terminal voltage of the power source battery 3 obtained during the detection of the voltage across the power source battery 3, and in the Figure, $T_1$ represents the no-load time, $T_2$ the charging time of the main capacitor as a load, $T_3$ the detecting time of the power source battery voltage, and $T_4$ the recharging time of the main capacitor after the flashing of the flash discharge tube 16. Numeral 21 designates a switch for flash photography, which is actuated to its h position for flash photography and moved to its f position when the flash unit is not used. Numeral 22 designates a switch which is operatively associated with the shutter release of the camera so as to be closed in response to the depression of the shutter release.

Thus, according to this embodiment, it is possible to check the remaining service life to the power source battery by means of the battery checker having only one preset voltage even if the power source battery is connected to the electronic flash light unit. In this case, the checking of power source battery can be divided into the following two methods depending on the manner in which the preset voltage of the battery checker is selected. In other words, the first method consists in experimentally obtaining a minimum operating voltage $V_F$ of the electronic flash light unit 2 and a minimum operating voltage $V_S$ of the electronic shutter circuit 1 and then detecting the battery voltage by means of a power source battery voltage detector and indicator circuit 5' utilizing the voltage of a higher voltage value (generally $V_S < V_F$) as a minimum operating voltage $V_L$ of the camera with flash unit. According to the second method, the minimum operating voltage $V_S$ of the electronic shutter circuit 1 is detected by the power source battery voltage detector and indicator circuit 5', and the minimum operating voltage $V_F$ of the electronic flash light unit 2 is detected by a lamp 23 which is lit when the main capacitor 14 has been charged to a predetermined value.

Firstly, in the case of the first method, a voltage dividing resistor 18 of the detector and indicator circuit 5' is adjusted so that the power source battery voltage detecting level satisfies the following equation (1):

$$V_L \times (R_2/R_1 + R_2) = V_{TH} \text{(constant)} \tag{1}$$

Where $V_L$ is the minimum operating voltage of the camera with flash unit, $R_1$ and $R_2$ are the resistance values of resistors 19 and 18, respectively, and $V_{TH}$ is the threshold voltage between the base and emitter of a transistor 20.

Under these conditions, if, for example, during the time that the flash light unit 2 is in operation due to the insufficient intensity of light on the object, the switch 17 is actuated to the d position so as to detect the voltage of the power source battery 3, a closed circuit including the power source battery 3, the dividing resistors 18 and 19 and the switch 17 is completed and at the same time the primary circuit of the flash light unit 2 previously in operation is opened, thus disconnecting the DC-DC converter 15 from the power source battery 3 and thereby causing the terminal voltage of the power source battery 3 to rapidly reach a stable condition at $\Delta T$ as shown in FIG. 5. In this case, if there holds the relation $$V_L \times (R_2/R_1 + R_2) > V_{TH},$$

then, in accordance with the equation (1), the transistor 20 is turned on and the indicator element 10 is turned on. Thus, the indicator element 10 indicates that the battery voltage is sufficient as a source of power for operating the camera with flash unit and advises the user of the fact that the camera with flash unit can be used continuously. On the contrary, when there holds the relation $$V_L \times (R_2/R_1 + R_2) < V_{TH},$$

then the transistor 20 is not turned on and also the indicator element 10 is not turned on, thus indicating that the battery voltage is insufficient and thereby advising the user of the need to recharge or replace the battery 3. With this method, since the higher-value minimum operating voltage $V_F$ of the electronic flash light unit 2 is utilized as the minimum operating voltage of the device, in the actual use the electronic shutter circuit 1 can still be operated for some length of time even after the condition of the battery has become such that the indicator element 10 is no longer turned on.

In the case of the second method, the voltage dividing resistor 18 of the battery voltage detector and indicator circuit 5' is adjusted so that the detecting level of the voltage across the power source battery 3 satisfies the following equation (2)

$$V_S \times (R_3/R_1 + R_3) = V_{TH} \quad (2)$$

where $V_S$ is the minimum operating voltage of the electronic shutter circuit 1, $R_1$ and $R_3$ are the resistance values of the resistors 19 and 18, respectively, and $V_{TH}$ is the threshold voltage between the base and emitter of the transistor 20.

Under these conditions, if, for example, during the time that the electronic flash light unit 2 is in operation due to the insufficient intensity of light on the object, the switch 17 is actuated to the d position in a like manner as mentioned previously to check the power source battery 3 for its ability to operate the electronic shutter circuit 1, a closed circuit including the power source battery 3, the dividing resistors 18 and 19 and the switch 17 is completed and at the same time the primary circuit of the electronic flash light unit 2 previously in operation is opened, thus disconnecting the main capacitor 14 from the power source battery 3 and thereby causing the battery voltage to rapidly return to a stable state at $\Delta T$ as shown in FIG. 5. In this case, if there holds the relation $$V_S \times (R_3/R_1 + R_3) > V_{TH},$$

then, according to the equation (2), the transistor 20 is turned on and the indicator element 10 is also turned on, thus indicating that the battery voltage is sufficient as a source of power for operating the electronic shutter circuit 1 and thereby advising the user of the fact that the electronic shutter circuit 1 can be continuously operated.

On the contrary, when there holds the relation $$V_S \, ; (R_3/R_1 + R_3) < V_{TH},$$

the transistor 20 is not turned on and the indicator element 10 is not turned on, thus advising the user of the fact that the capacity of the battery voltage is not sufficient and thereby calling on the user to recharge or replace the power source battery 3.

When it is desired to take photographs by utilizing the electronic flash light unit 2, this is accomplished by actuaing the switch 17 to the e position and the switch 21 to the h position.

What is claimed is:

1. A battery checker for a camera which includes an electronic shutter circuit for automatically controlling exposure in accordance with the brightness of an object, an electronic flash unit, and a battery which energizes both said shutter circuit and said electronic flash unit, comprising:
   a voltage detector circuit selectively connectable with said battery for providing an output signal when the voltage across said battery exceeds a predetermined value;
   means responsive to said output signal for providing a visual indication when the voltage across said battery exceeds said predetermined value; and,
   a mechanical switch having a first operative position which connects said battery to said flash light unit and disconnects said voltage detector circuit from said battery and a second operative position which disconnects said battery from said flash light unit and connects said voltage detector circuit with said battery.

2. A battery checker according to claim 1 wherein said voltage detector circuit and means for providing a visual indication comprises:
   a resistance voltage divider connected across said battery,
   a transistor having a base connected to said voltage divider, and
   a light emitting diode connected to the output of said transistor.

3. A battery checker for a camera which includes an electronic shutter circuit for automatically controlling exposure in accordance with the brightness of an object, an electronic flash unit, and a battery which energizes both said shutter circuit and said electronic flash unit, comprising:
   a voltage detector circuit connected with said battery for providing an output signal when the voltage across said battery exceeds a predetermined value;
   means responsive to said output signal for providing a visual indication when the voltage across said battery exceeds said predetermined value;
   a mechanical switch having a first operative position which connects said battery with said flash light unit and a second operative position which disconnects said battery from said flash light unit; and,
   a light shielding plate mechanically coupled with said switch for movement therewith, said shielding plate covering said visual indication means when said switch is in its first operative position and uncovering said visual indication means when said switch is in its second operative position.

4. A battery checker according to claim 3 wherein said voltage detector circuit and means for providing a visual indication comprises:
   a resistance voltage divider connected across said battery,
   a transistor having a base connected to said voltage divider, and
   a light emitting diode connected to the output of said transistor.

5. A battery checker for a camera which includes an electronic shutter circuit for automatically controlling exposure in accordance with the brightness of an object, an electronic flash unit, and a battery which energizes both said shutter circuit and said electronic flash unit, comprising:
   a voltage detector circuit connected with said battery for providing an output signal when the voltage across said battery exceeds a predetermined value;
   a mechanical switch having a first operative position which connects said battery with said flash light unit and a second operative position which disconnects said battery from said flash light unit;
   a second switch connected between said voltage detector circuit and said battery and having first and second operative positions which, respectively, connect said voltage detector circuit with, and disconnect said voltage detector from said battery; and, means for mechanically coupling said mechanical switch with said second switch such that said second switch is prevented from moving from its second operative position to its first operative position when said mechanical switch is in its first operative position.

6. A battery checker according to claim 5, wherein said voltage detector circuit and means for providing a visual indication comprises:

a resistance voltage divider connected across said battery, a transistor having a base connected to said voltage divider, and a light emitting diode connected to the output of said transistor.

7. A battery checker for a camera which includes an electronic shutter circuit for automatically controlling exposure in accordance with the brightness of an object, an electronic flash unit, and a battery which energizes both said shutter circuit and said electronic flash unit, comprising:

a voltage detector and visual indicator circuit including a resistive voltage divider connected across said battery, a transistor having a base connected between the resistors of said voltage divider, and a light emitting diode connected to the output of said transistor;

a first switch having a first operative position which connects said electronic flash unit with said battery and a second operative position which disconnects said electronic flash unit from said battery; and, a second switch having first and second terminals and a common terminal, said second switch having first and second operative positions which respectively connect the common terminal with the first and second terminals, said battery and said shutter circuit being connected to said common terminal, said voltage detector and visual indicator circuit being connected to said first terminal, and said electronic flash unit being connected to said second terminal.

* * * * *